US010191966B2

(12) United States Patent
Pallath et al.

(10) Patent No.: US 10,191,966 B2
(45) Date of Patent: Jan. 29, 2019

(54) ENABLING ADVANCED ANALYTICS WITH LARGE DATA SETS

(71) Applicant: Busines Objects Software Ltd., Dublin (IE)

(72) Inventors: Paul Pallath, Naas (IE); Rouzbeh Razavi, Dublin (IE)

(73) Assignee: Business Objects Software Ltd., Dublin (IE)

( * ) Notice: Subject to any disclaimer, the term of this patent is extended or adjusted under 35 U.S.C. 154(b) by 707 days.

(21) Appl. No.: 14/794,398

(22) Filed: Jul. 8, 2015

(65) Prior Publication Data
US 2017/0011111 A1  Jan. 12, 2017

(51) Int. Cl.
G06F 17/30 (2006.01)

(52) U.S. Cl.
CPC .. *G06F 17/30598* (2013.01); *G06F 17/30539* (2013.01)

(58) Field of Classification Search
None
See application file for complete search history.

(56) References Cited

U.S. PATENT DOCUMENTS

| | | | |
|---|---|---|---|
| 6,374,251 B1 * | 4/2002 | Fayyad | G06F 17/30705 |
| 7,650,644 B2 | 1/2010 | Cheng et al. | |
| 8,056,091 B2 | 11/2011 | Brunswig et al. | |
| 8,417,715 B1 | 4/2013 | Bruckhaus et al. | |
| 8,473,431 B1 | 6/2013 | Mann et al. | |
| 9,009,175 B2 | 4/2015 | Sitt | |
| 2014/0208293 A1 | 7/2014 | Pusz et al. | |
| 2014/0303953 A1 | 10/2014 | Bates | |

(Continued)

OTHER PUBLICATIONS

Schmidt, Eric "Every 2 Days We create as Much Information as We Did Up to 2003"; TechCrunch; last visited Jul. 6, 2015; http://techcrunch.com/2010/08/04/schmidt-data/.

(Continued)

*Primary Examiner* — Alex Gofman
*Assistant Examiner* — Umar Mian
(74) *Attorney, Agent, or Firm* — Fish & Richardson P.C.

(57) ABSTRACT

The present disclosure describes methods, systems, and computer program products for enabling advanced analytics with large datasets. One computer-implemented method includes receiving, by operation of a computer system, a dataset of multiple data records, each of the plurality of data records comprising one or more features and a target variable; selecting key features among the one or more features based at least on relevance measures of the one or more features with respect to the target variable; dividing the dataset into multiple subsets; for each of the multiple subsets, identifying a number of clusters and respective centroids of the number of clusters based on the key features; identifying a number of final centroids based on the respective centroids of the number of clusters for the each of the number of subsets, the number of final centroids being respective centroids of a number of final clusters; and for each data record in the multiple subsets, assigning the data record to one of the number of final clusters based on distances between the data record and the number of final centroids.

15 Claims, 11 Drawing Sheets
(5 of 11 Drawing Sheet(s) Filed in Color)

(56) References Cited

U.S. PATENT DOCUMENTS

2014/0337331 A1* 11/2014 Hassanzadeh .... G06F 17/30578
707/726
2016/0147758 A1* 5/2016 Chhaya ............. G06F 17/30035
707/733

OTHER PUBLICATIONS

Manyika et al., "Big data: the next frontier for innovation, competition, and productivity" ; Report MicKinsey Global Institute; last visited Jul. 6, 2015; http://www.mckinsey.com/insights/business_technology/big_data_the_next_frontier_for_innovaton.
U.S. Appl. No. 14/662,502, filed Mar. 19, 2015, Pallath, et al.
U.S. Appl. No. 14/877,764, filed Oct. 7, 2015, Pallath, et al.
U.S. Appl. No. 15/185,951, filed Jun. 17, 2016, Wu, et al.
U.S. Appl. No. 15/364,681, filed Nov. 30, 2016, Pallath, et al.

* cited by examiner

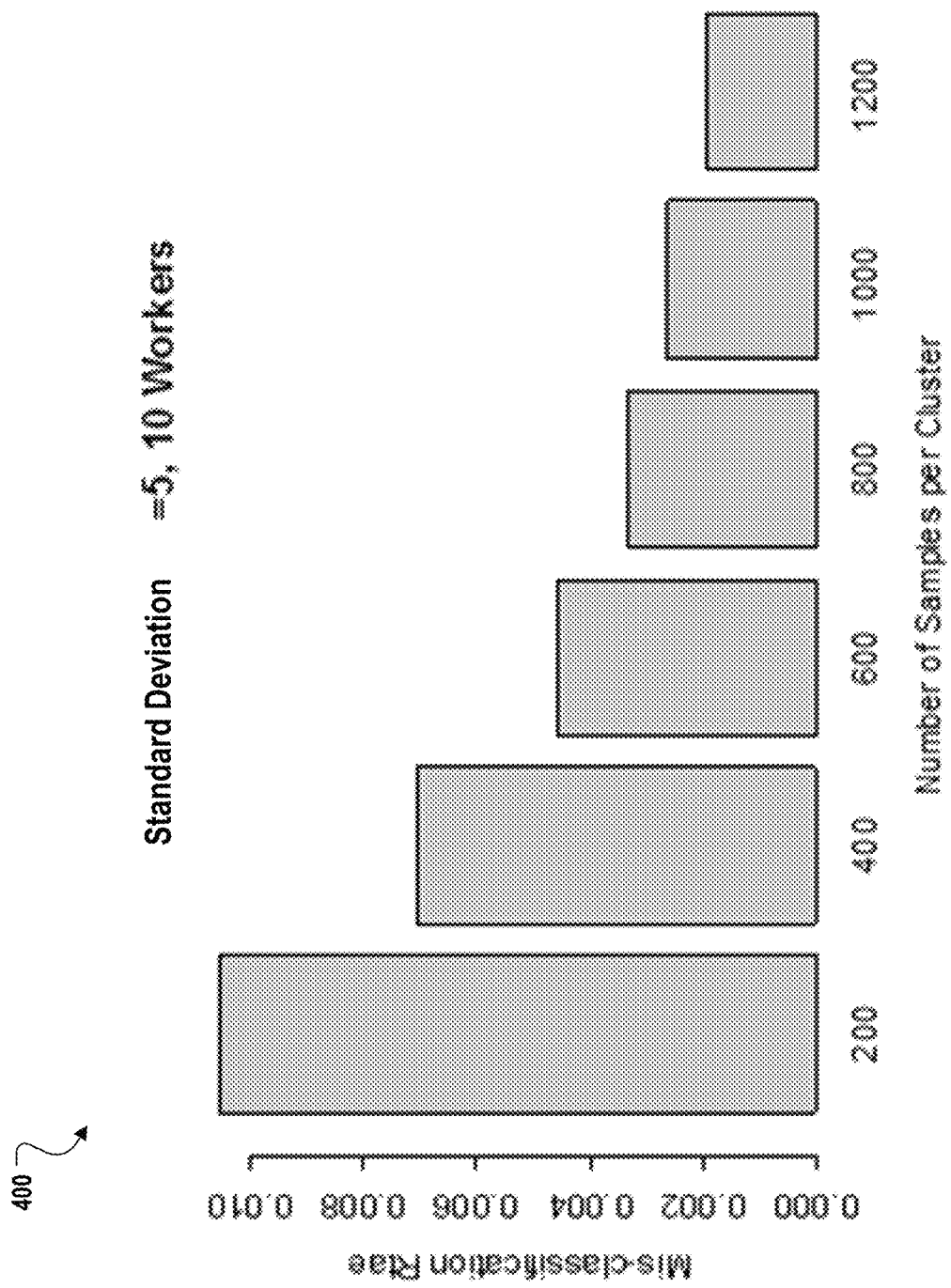

ENABLING ADVANCED ANALYTICS WITH LARGE DATA SETS

BACKGROUND

For analytics frameworks, Big Data is a broad term referring to data sets where traditional data processing is inadequate—typically because the data sets are extremely large or complex. Big Data challenges include search, sharing, transfer, visualization, privacy, curation of data, analysis, and the like. Three core elements exist in advanced analytics frameworks: data, algorithms, and computation platforms.

In the modern digital world, data volumes have been growing in size and complexity at an exponential rate. In addition, the growing variety, velocity and veracity of the data also contribute to the complexity of a Big Data world.

Algorithms used for analysis of the data and for data mining tasks are, however, more or less the same as those used in past years. As such, apart from custom implementations, the algorithms being employed for Big Data may not significantly differ from what has been traditionally available.

Computational platforms have seen a number of significant innovations in past years both from the hardware as well architectural design perspectives. This has made it possible to harvest intensive data volumes by introducing parallelization of tasks (e.g., Map-Reduce frameworks and the like). Such frameworks are designed to cope with high dimensional data that are used as the input of analytical platforms and tools for extracting data. At a very high level, these platforms try to address two correlated issues, feasibility of data processing due to hardware limitations, and unreasonable execution time. One major challenge in harvesting the benefits from Map-Reduce like solutions is to convert the computation task into parallel executable subtasks (mapping) and to combine the results later on (reducing). While being suitable for a family of computations (such as embarrassingly parallel tasks), there are scenarios where transforming the computation task into a format suitable for Map-Reduce either requires significant modifications and efforts or is impossible (e.g., most of the holistic algorithms where full data view is required).

It is desirable to have techniques to handle the large amount of data using existing or emerging data mining algorithms while leveraging the advanced computational platform, for example, by parallel processing, to provide "Big Data Technology Solutions."

SUMMARY

The present disclosure relates to computer-implemented methods, computer-readable media, and computer systems for enabling advanced analytics with large datasets. One computer-implemented method includes receiving, by operation of a computer system, a dataset of multiple data records, each of the multiple data records comprising one or more features and a target variable; selecting key features among the one or more features based at least on relevance measures of the one or more features with respect to the target variable; dividing the dataset into multiple subsets; for each of the multiple subsets, identifying a number of clusters and respective centroids of the number of clusters based on the key features; identifying a number of final centroids based on the respective centroids of the number of clusters for the each of the number of subsets, the number of final centroids being respective centroids of a number of final clusters; and for each data record in the multiple subsets, assigning the data record to one of the number of final clusters based on distances between the data record and the number of final centroids.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes (or causes the system) to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination.

A first aspect, combinable with the general implementation, further comprising assigning a respective processor to each of the multiple subsets; wherein, for each of the multiple subsets, identifying a number of clusters and respective centroids of the clusters comprises identifying, by the respective processor of the each of the multiple subsets, the number of clusters and respective centroids of the clusters; and wherein, for each data record in the multiple subsets, assigning the data record to one of the number of final clusters comprises, for each data record in the multiple subsets, assigning, by the respective processor of the each of the multiple subsets, the data record to one of the number of final clusters.

A second aspect, combinable with any of the previous aspects, further comprising selecting a respective number of data records from each of the number of final clusters to represent the dataset of the multiple data records; and performing a data mining algorithm based on the respective number of data records from each of the number of final clusters.

A third aspect, combinable with any of the previous aspects, wherein the respective number of data records from each of the number of final clusters exceeds a respective threshold or is proportional to a respective size of each of the number of final clusters.

A fourth aspect, combinable with any of the previous aspects, wherein selecting key features among the one or more features comprises selecting a first subset of data records with a first size from the dataset of the multiple data records; selecting a first subset of features from the one or more features of the first subset of data records; selecting a second subset of features from the one or more features of the first subset of data records; computing a similarity metric between the first subset of features and the second subset of features; determining that the first subset of features and the second subset of features converge based on the similarity metric; and in response to the determination, identifying key features of the dataset based on the first subset of features and the second subset of features of the first subset of data records.

A fifth aspect, combinable with any of the previous aspects, wherein selecting key features among the one or more features further comprises calculating a first set of relevance measures of each of the first subset of features with respect to the target variable; calculating a second set of relevance measures of each of the second subset of features with respect to the target variable; and wherein computing a similarity metric comprises computing the similarity metric based on the first set of relevance measures and the second set of relevance measures.

A sixth aspect, combinable with any of the previous aspects, further comprising determining that the first subset of features and the second subset of features do not converge based on the similarity metric; in response to the determination, selecting a second subset of data records with a second size from the dataset of the multiple data records, the second size of the second subset of data records being larger than the first size of the first subset of data records; selecting a third subset of features from the one or more features of the second subset of data records; selecting a fourth subset of features from the one or more features of the second subset of data records; computing a second similarity metric between the third subset of features and the fourth subset of features; determining that the third subset of features and the fourth subset of features converge based on the second similarity metric; and in response to the determining, identifying key features of the dataset based on the third subset of features and the fourth subset of features of the subset of data records.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

The patent or application file contains at least one drawing executed in color. Copies of this patent or patent application publication with color drawing(s) will be provided by the Office upon request and payment of the necessary fee.

FIGS. 4A and 4B are plots illustrating clustering results of an example distributed clustering method and a traditional clustering approach according to an implementation.

Like reference numbers and designations in the various drawings indicate like elements.

DETAILED DESCRIPTION

Figure 1:
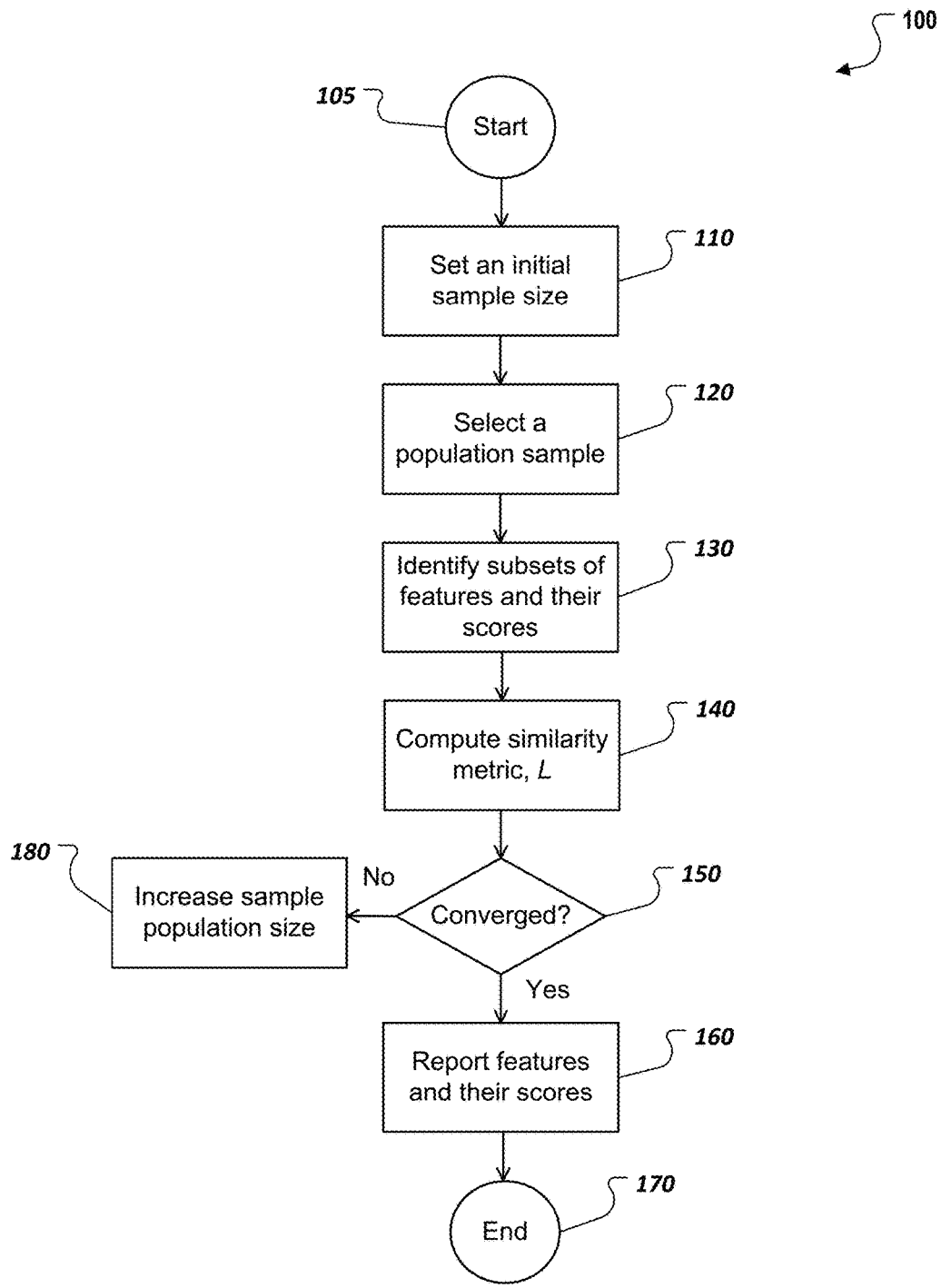
FIG. 1 is a flow chart illustrating a feature selection process according to an implementation.

The following detailed description is presented to enable a person skilled in the art to make, use, and/or practice the disclosed subject matter, and is provided in the context of one or more particular implementations. Various modifications to the disclosed implementations will be readily apparent to those skilled in the art, and the general principles defined herein may be applied to other implementations and applications without departing from the scope of the disclosure. Thus, the present disclosure is not intended to be limited to the described and/or illustrated implementations, but is to be accorded the widest scope consistent with the principles and features disclosed herein.

Example techniques are described for enabling advanced analytics with large data sets. In some aspects, the example techniques provide a practical solution to address the issue of a curse of dimensionality, especially in the Big Data paradigm. The example techniques can intelligently segment the data and use the defined segments to choose a representative set of training data for a given analytical task. The example techniques can include an intelligent data selection process. The "intelligent" or "smart" data selection can be generally defined as a selection of a subset of training data for constructing an analytical model without considerable loss of prediction or explanatory power of the model compared to a case where original data as a whole is used for model training "Intelligence" in the selection process can depend on specific analytical task(s) that need to be performed. In some instances, a subset of the available data might be perfectly suited for one specific analytical task but perform poorly for another.

Unlike using only a subset of data at random from a big dataset for manageability with traditional analytical software packages but with significant performance degradation, the example techniques can select data samples that preserve the characteristics of the original big dataset. In some instances, maintaining the representativeness of the selected data in relation to the original dataset depends on the context of the analytical task as well.

Additionally, unlike conventional clustering algorithms that consider all features of the dataset to be important to group the data records, the example techniques can use only a subset of all features, for example, only those that are relevant to the given task. As such, the example techniques can have improved efficiency and effectiveness.

In some implementations, the described example techniques can include three steps, which are described in more detail below.

Step 1: Identification of relevant features in the original dataset for a given analytical task.

Step 2: Segmentation of data into groups based on the relevant features identified in Step 1.

Step 3: Selecting the data based on the segments identified in Step 2.

In Step 1, the important or key features that are relevant to the particular data mining task to be performed are identified. Moreover, the output of Step 1 is not only the key features but can additionally or optionally include their corresponding importance scores that can be used as a measure to establish weights among the key features. The importance scores can be used in Step 2 for clustering. For example, in some implementations, the similarity/dissimilarity of data records can be determined based on the difference between the values of key features and can be additionally amplified or discounted according to the importance scores of the corresponding features.

Based on the identified key features, the example techniques can enable smart sampling through clustering the input data. The example techniques can improve the scalability of the data segmentation process and be used to handle large datasets. The example techniques address the challenges in making full use of the advanced computational platforms and allow exploiting the benefits of parallelization of tasks (e.g. in a Map-Reduce manner). In addition, the example techniques can leverage functionalities of the advanced parallelised framework into existing applications. For example, the example techniques allow existing standalone data mining analytical software suits or packages to handle large amounts of data without any complex and expensive modification of the software suits.

The feasibility of the example techniques have been confirmed by prototypes and measurement results. Significant performance gains have been shown in terms of providing support for handling larger data sets as well as in saving computation time and addressing hardware (e.g., memory, processing, storage etc.) issues. In some implementations, the example techniques can be implemented in a fully distributed fashion, making it possible to benefit from big data technologies such as Hadoop echo-system together with existing standalone software packages without the need for significant modification of the standalone packages. The example techniques can achieve additional or different advantages.

Step 1: Identification of key features in the original dataset for a given analytical task A dataset can include a number of data records (can also be referred to as data points, samples, or observations). Each data record can include a number of features and optionally a target variable. In some implementations, the dataset can be represented as a table, a matrix, or another data structure. In some implementations, rows of the table can represent the data records and the columns can represent the features. The target variable can also be stored in a column. The target variable can be a label, a category, a class, or other variables such as continuous values that are to be modelled and predicted by a data mining algorithm based on the features for supervised and/or unsupervised analytical tasks.

For analytics and data mining tasks, in some instances, key features can be identified using a small portion of the total data population. Identification of key features for the data mining tasks can be realized in many different ways. As one example, when dealing with a supervised learning method, a correlation between individual features and the target variable can be considered as a measure of relevance. A threshold value can then be used to select a set of key features. In doing so, not only a set of key features are identified, but a measure of relevance is additionally returned (e.g., the absolute feature-target correlation values). However, if the number of selected data records are not "sufficient enough", key features may be misidentified. Whether the selected data records are "sufficient enough" can depend on the structure of the data, the nature of the problem to be solved, selected analytical method(s), and other criteria consistent with this disclosure. The example techniques for enabling advanced analytics with large data sets can also include a feature selection method to assure relevant features are correctly identified.

FIG. 1 is a flow chart illustrating a feature selection method 100 according to an implementation. The example method 100 can be performed, for example, by the example computer or computer system as described with respect to FIG. 5, or any other suitable system, environment, software, and hardware, or a combination of systems, environments, software, and hardware as appropriate. In some implementations, various steps of method 100 can be run in parallel, in combination, in loops, and/or in any order.

The method 100 can start at 105 and proceed to 110.

At 110, an initial population size $S_1$ can be determined. $S_1$ can be a predefined absolute value (e.g., 10,000 samples) or a ratio (e.g., 5% of the total population size) or a combination of these. In some implementations, $S_1$ can be a default, fixed value, or it can vary. $S_1$ can be specified by a user or be determined and updated automatically, for example, by a computer system. From 110, method 100 proceeds to 120.

At 120, a first subset of data records with size $S_1$ is selected from the full dataset of data records. In some implementations, the first subset of data records can be selected from the full dataset uniformly, randomly, or in another manner. From 120, method 100 proceeds to 130.

At 130, one or more subsets of features and their scores can be identified. A score of a feature can be a quantitative measure of relevance between the feature and the target variable for a given analytical algorithm. In some implementations, the one or more subsets of features and their scores can be identified in two or more phases or stages.

For example, in a first phase, a first subset of features $f_1$ is selected, $f_1 \subset F$ where F represents the set of all features in the dataset. The first subset of features $f_1$ can be selected according to certain feature selection algorithms (e.g., correlation analysis, Random Forest, decision trees, etc.)

In some implementations, a first set of relevance measures or scores, $w_1$, for the first subset of features $f_1$ are calculated. $w_1$ is a vector of the same size as $f_1$ where each element in $w_1$ represents the relative/normalised importance or score of the corresponding feature in $f_1$ with respect to the target variable.

In a second phase, a second, different subset of samples $f_2$ can be selected. The second subset of samples $f_2$ can be selected from all the features of dataset in a similar manner to first subset of features $f_1$.

The corresponding relevance scores, $w_2$, for the second subset of samples $f_2$ can be computed. The selected feature sets, $f_1$ and $f_2$, and their respective relevance measures, $w_1$ and $w_2$, can be returned. From 130, method 100 proceeds to 140.

In some instances, if the feature selection process was stable in the first phase (i.e., relevant features were correctly identified in $f_1$), the feature selection results of the first and the second phases should be inline. Otherwise, if significant variations exist between the results of the two phases, it indicates that the identified features are not consistent and selected features were not stable. As such, the size of the sample size can be increased from an iteration to the next (i.e., $S_{n+1} > S_n$ until the results from two consecutive iterations converge (does not significantly deviate). To determine convergence or "significant variations," various similarity metrics or measures can be used.

At 140, a similarity metric between the first subset of features and the second subset of features is computed. As an example, consider key features that are identified during iteration n−1 and iteration n being respectively denoted as $f_{n-1}$ and $f_n$. One example measure of similarity is the ratio between the number of common elements between the two sets to the overall size of the longer vector:

$$L_{n-1,n} = \frac{|C_{n-1,n}|}{\max(|f_{n-1}|, |f_n|)} \quad (1)$$

where $L_{n-1,n}$ represents the measure of similarity between the two feature vectors, $f_{n-1}$ and $f_n$, and $C_{n-1,n}$ represents the common elements between $f_{n-1}$ and $f_n$, (i.e., $C_{n-1,n} = f_{n-1} \cap f_n$) and |.| represents the cardinality or the number of elements of the input.

As another example, the similarity metric can be defined by additionally considering the scores of the features, w. For example, the relevance score of elements of $C_{n-1,n}$ can be computed as the minimum of the scores of the elements in their original vector, $w_{n-1}$ and $w_n$:

$$\forall c \in C_{n-1,n}, \, _c c = \min(_{n-1}{}^c, {}_n{}^c) \quad (2)$$

where $_n{}^c$ is the score of the element c in the feature vector $f_n$. Then, the similarity metric $L_{n-1,n}$ can be defined as:

$$L_{n-1,n} = \frac{\sum_{\forall c \in C_{n-1,n}} c}{\max\left(\sum_{\forall c \in f_{n-1}} {}_{n-1}c, \sum_{\forall c \in f_n} {}_n c\right)}. \quad (3)$$

Similar to equation (1), $L_{n-1,n}$ represents the measure of similarity between the two feature vectors, $f_{n-1}$ and $f_n$. The larger $L_{n-1,n}$, the higher is the similarity between the two feature sets $f_{n-1}$ and $f_n$. In some implementations, $L_{n-1,n}$ is used as a measure to decide if the identified key features are robust or not. From 140, method 100 proceeds to 150.

At 150, whether the first subset of features $f_1$ and the second subset of features $f_2$ converge can be determined based on the similarity metric. In some implementations, the subsets of features can be considered converged if the calculated similarity metric $L_{n-1,n}$ equals or exceeds a predefined threshold T (e.g., T=0.8 or another value). In this case, method 100 proceeds from 150 to 160.

At 160, the identified key features and their respective scores are reported, for example, by being returned as the outputs of Step 1 and used as inputs for clustering the dataset in Step 2. The identified key features can include the intersection, the combination, or a variation thereof the first subset of features $f_1$ and the second subset of features $f_2$. From 160, method 100 proceeds to 170. After 170, method 100 ends.

In some instances, at 150, it may be determined that the first subset of features $f_1$ and the second subset of features $f_2$ do not converge, for example, when the calculated similarity metric $L_{n-1,n}$ is below a predefined threshold T. In this case, method 100 proceeds from 150 to 180.

At 180, the sample population size $S_1$ is increased, for example, to $S_2$. From 180, method 100 goes back to 120 to select a subset of data records with size $S_2$ from the full dataset of data records and repeat the above operations. For example, a third subset of features and a fourth subset of features can be selected from all features of the second subset of data records with size $S_2$. The iterations can continue, each time increasing the number of samples, until the features of two consecutive subsets converge. In some implementations, each new iteration can contain the data records from the previous iteration or can be a new subset of the total population of data records.

Step 2: Segmentation of data into groups based on the key features identified in Step 1.

Once the key features are identified, then the dataset can be grouped into a number of clusters based on the key features identified in Step 1. In some implementations, the clustering process can be realized in two steps and in a hierarchal, distributed manner.

Figure 2:
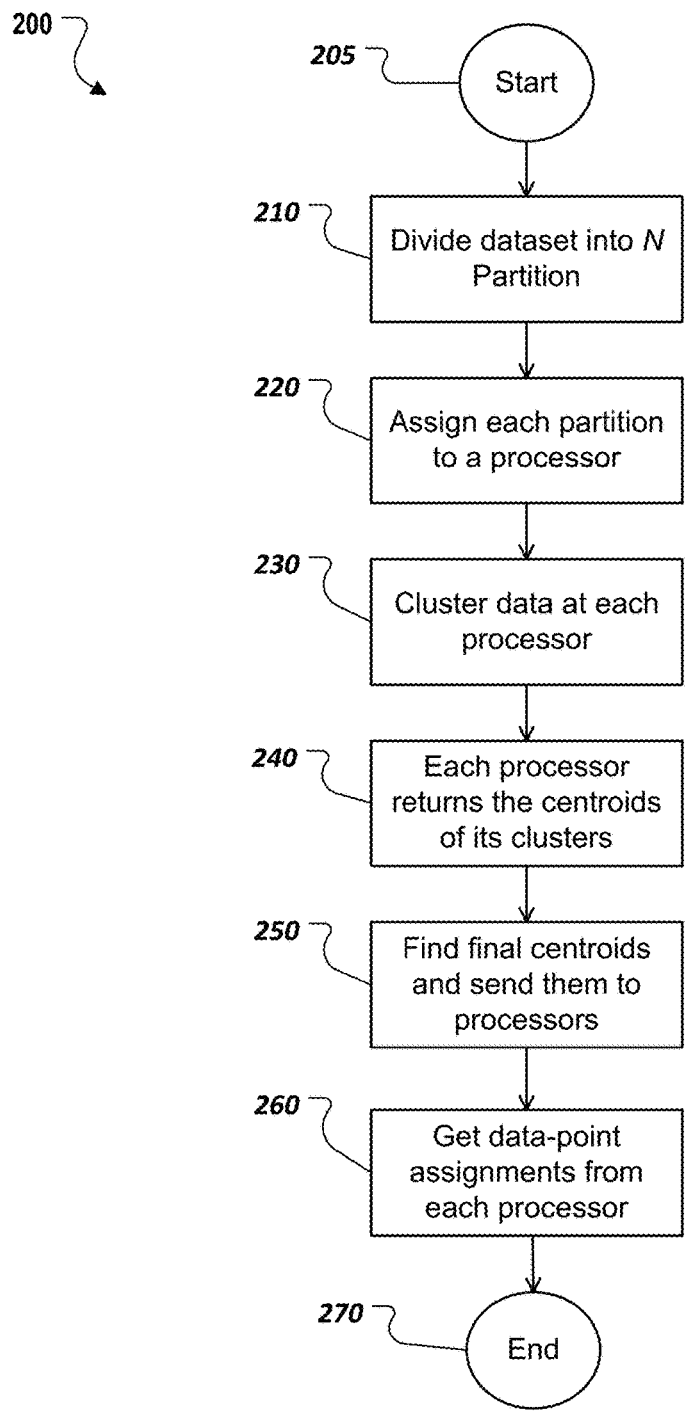
FIG. 2 is a flow chart illustrating a method for segmenting a dataset into clusters according to an implementation.

FIG. 2 is a flow chart illustrating a method 200 for segmenting a dataset into clusters according to an implementation. The example method 200 can be performed, for example, by the example computer or computer system as described with respect to FIG. 5, or any other suitable system, environment, software, and hardware, or a combination of systems, environments, software, and hardware as appropriate. In some implementations, various steps of method 200 can be run in parallel, in combination, in loops, and/or in any order. The method 200 can start at 205 and proceed to 210.

At 210, the full dataset is divided into N subsets. N can be the number of processing units available (e.g., the number of mappers in a Map-Reduce framework) of the computer system, or another number. The full dataset of data records can be partitioned into N parts, for example, uniformly at random, proportional to the processing power or available memory of the processing units, or in another manner. From 210, method 200 proceeds to 220.

At 220, each subset of data records can be assigned a respective processing unit (e.g., processors). The processing units can be co-located within a same computer or it can be distributed and connected via the network, for example, based on the cloud computing techniques. The processing units can have the same or different processing power. In some instances, a single processing unit may be assigned to one or more subsets of data records. In some implementations, the example method 200 can be performed by a single processing unit without assigning the subsets of data records to other processing unit. From 220, method 200 proceeds to 230.

At 230, for each of the N subsets, each processing unit can perform a segmentation task to identify a number of clusters, M, within the respective subset based on the key features. The number of clusters M can be the same across all the clusters. The number of clusters M can be, for example, specified by an administrator or a user based on the specific data mining tasks, or be determined based on other algorithms.

Any point-assignment-based clustering algorithm can be used to group or segment each subset of data records into clusters. In some implementations, the clustering algorithm can be performed based on a distance or similarity measure between the data records, for example, based on the features, the scores of the features, or a combination thereof. For example, the key features and scores identified in the Step 1 can be used for measuring distance or similarity between data records. Consider a hypothetical dataset, in which each data record has 500 features. After Step 1, depending on the given analytical task, 20 key features and their corresponding scores of relevance can be determined. To compute a measure of distance between two data records of the dataset, a weighted sum of difference between these 20 features of the two data records can be used, where the relevance score of the features can be used as the weightings. Then a point-assignment-based clustering algorithm can be performed, for example, by each processing unit, to group its assigned subset of data records into M clusters based on the a weighted sum of difference. From 230, method 200 proceeds to 240.

At 240, respective centroids of the M clusters are identified, for example, by the respective processing unit of the each of the N subsets. A centroid of an object in an n-dimensional space can be the geometric center or the mean ("average") position of all the points in all of the coordinate directions of the n-dimensional object. For example, in a two-dimensional case, a centroid of a two-dimensional object is the arithmetic mean position of all the points in the two-dimensional shape. A centroid of a cluster can be determined, for example, by applying the k-means clustering algorithm in that data records belongs to the cluster with the nearest centroid, serving as a prototype of the cluster. In some implementations, each of the N processing units can return the centres of their identified clusters. From the Map-Reduce architecture, this can be seen as the map stage. From 240, method 200 proceeds to 250.

At 250, P final centroids are identified based on the respective centroids of the M clusters for the each of the N subsets. The P final centroids are the respective centroids of P final clusters. P can be the same as or different from M. In general, the final centroids of the final clusters are different from the centroids of the M clusters for each of the N subsets. In some instances, one or more final centroids may coincide with one or more centroids of the clusters for a single subset. In some implementations, the final centroids can be determined by performing another round of clustering or another data mining algorithm using the M×N centroids identified at 240. For example, all of the M×N centroids are again clustered to determine the final cluster centroids. This is akin to the reduce stage of the Map-Reduce architecture. In some implementations, a final centroid for a final cluster can be determined by averaging, weighted summing, or otherwise manipulating the centroids associated with a final cluster. From 250, method 200 proceeds to 260.

At 260, for each data record in the N subsets, the data record is assigned to one of the M final clusters based on distances between the data record and the M final centroids. For example, the data record can be assigned to the final cluster corresponding to its nearest final centroid among the M final centroids. In some implementations, the data record can be assigned to another final cluster among the M final centroids based on other criteria (e.g., other features of the data record). Assigning a data record to a respective final cluster can include, for example, adding or modifying a column or a label of the data record to include an indication of the association of the data record with the final cluster.

In some implementations, assigning the data records to respective final clusters can be performed in a distributed manner by parallel processing of the multiple processing units. For example, the coordinates or other information of the P final centroids can be passed back to each of the multiple processing units. Each processing unit can determine the association of each data point in its assigned subset to one of the P final clusters. As a result, the whole dataset is clustered. From 260, method 200 proceeds to 270.

After 270, method 200 ends.

Figure 3B:
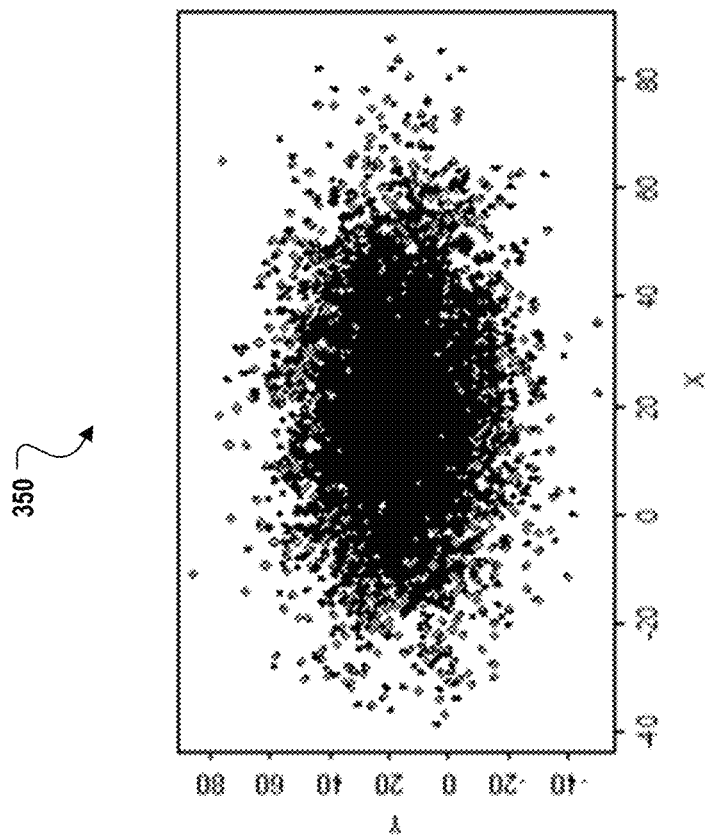
FIGS. 3A and 3B are plots showing example datasets used in experimentations of an example distributed clustering method according to an implementation.
Figure 3A:
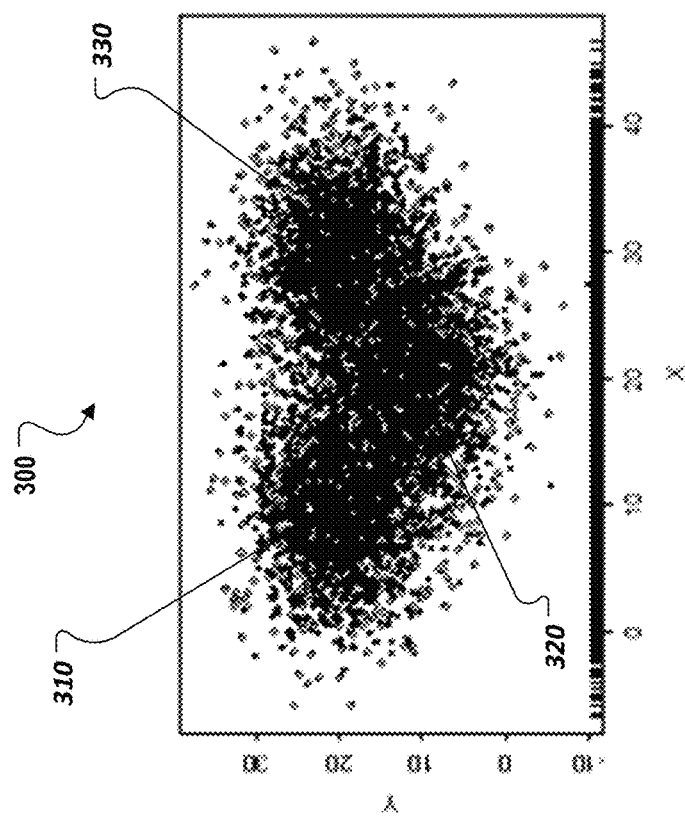

FIGS. 3A and 3B are plots showing example datasets 300 and 350 used in experimentations of the distributed clustering method 200 according to an implementation. As shown in FIG. 3A, three clusters 310, 320, and 330 can be detected in this hypothetical example. The spread of the data points from the centres follows a normal distribution. The standard deviation of the spread of the dataset 300 in FIG. 3A is 5 while the standard deviation of the spread of the dataset 350 in FIG. 3B is 15. It can be seen that clusters becomes more difficult to distinguish in dataset 350 in FIG. 3B when increasing the standard deviation of the spread.

Figure 4B:
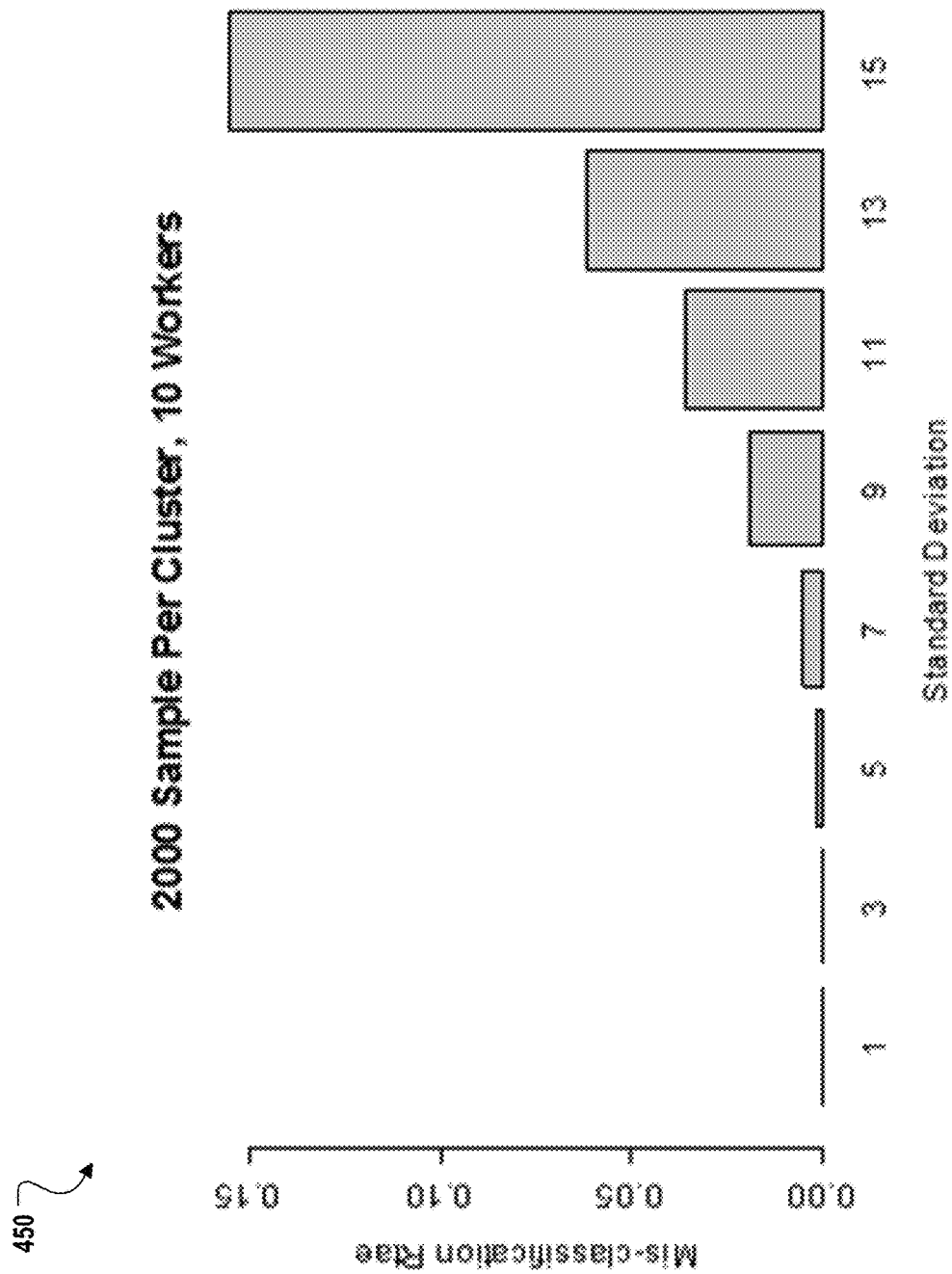

FIG. 4A and 4B are plots 400 and 450 illustrating clustering results of the distributed clustering method 200 and a traditional clustering approach according to an implementation. Specifically, FIG. 4A shows misclassification versus the number of samples per cluster. The misclassification refers to the ratio of the data records that are clustered differently using these two approaches. As shown in FIG. 4A, the two approaches perform similarly and that the misclassification rate is very low and becomes even less significant as the number of samples per clusters increases.

FIG. 4B shows the misclassification rate as a function of the standard deviation of the distribution. As shown in FIG. 4B, even in the extreme case of the dataset 350 in FIG. 3B, the distributed clustering method 200 still provide satisfactory performances, further confirming the feasibility of the distributed clustering method 200. In some implementations, since these clusters are later used for selecting a subset of data points, they are not required to be very precisely defined.

Step 3: Selecting the data samples based on the segments identified in Step 2.

In Step 3, a respective number of data records from each of the P final clusters can be selected to represent the full dataset. Having defined the clusters of the full input dataset, in relation to the given analytical task, smart sampling approach can be used to assure that the selected samples represent the entire input population for that analytical task. One example approach to select respective number of data records from each of the final clusters can make the number of samples that are taken from each cluster to be proportional to the relative size of the final cluster compared to the overall population of the full dataset. In some implementations, there might be clusters with few data records that are indeed interesting for the analytics task. In that case, another sampling approach is to make sure that the number of data records selected from each final cluster exceeds a certain minimum level. Additional or different selection criteria or approaches can be used. In some implementations, oversampling or other techniques of selecting data samples can be applied if needed.

Based on the data samples selected in Step 3, a data mining algorithm can be used, for example, for performing advanced analytics. For example, a regression, classification, or other analytic model can be built based on a respective number of data records from each of the final clusters selected in Step 3. The regression or classification model can be used for prediction or other advanced analytics. Due to the smaller size of the selected data samples, the advanced analytics that cannot be performed on the original large dataset are made practical. The representative nature of the selected data sample can help guarantee the validity and effectiveness of the derived analytic model and other advanced analytics.

Figure 5:
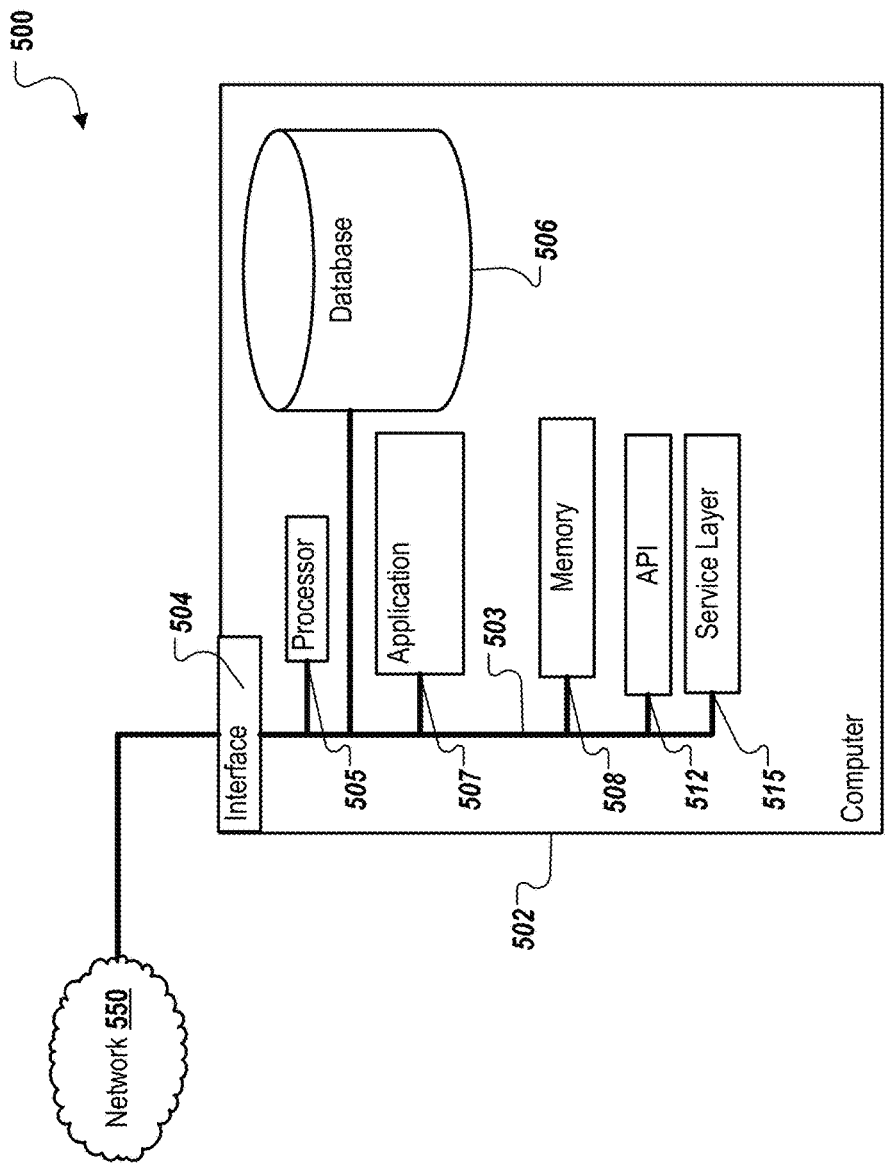
FIG. 5 is a block diagram of an exemplary computer that can be used for enabling advanced analytics with large data sets according to an implementation.

FIG. 5 is a block diagram 500 of an exemplary computer 502 that can be used for enabling advanced analytics with large datasets according to an implementation. The computer 502 can be a stand-alone computer system or a component of an example distributed computing system (EDCS, for example, a client-server system) for enabling advanced analytics with large datasets according to an implementation. The illustrated computer 502 can encompass any computing device such as a server, desktop computer, laptop/notebook computer, wireless data port, smart phone, personal data assistant (PDA), tablet computing device, one or more processors within these devices, or any other suitable processing device, including both physical and/or virtual instances of the computing device. Additionally, the computer 502 may comprise a computer that includes an input device, such as a keypad, keyboard, touch screen, or other device that can accept user information, and an output device that conveys information associated with the operation of the computer 502, including digital data, visual and/or audio information, or a GUI.

The computer 502 can process for/serve as a client, a server, a UI layer, an application, and/or any other component of the EDCS. The illustrated computer 502 is communicably coupled with a network 550. In some implementations, one or more components of the computer 502 may be configured to operate within a cloud-computing-based environment. In some instances, the implementations of the example techniques described in this disclosure do not necessarily need the connection to the network.

At a high level, the computer 502 is an electronic computing device operable to receive, transmit, process, store, or manage data and information associated with the EDCS. According to some implementations, the computer 502 may also include or be communicably coupled with a cloud-computing server, application server, e-mail server, web server, caching server, streaming data server, business intelligence (BI) server, and/or other server.

The computer 502 can receive requests over network 550 from a client application (e.g., a mobile UI, web-based application UI, and/or a desktop application executing on this or another computer 502 in use by a customer) and respond to the received requests by processing the said requests in an appropriate software application. In addition, requests may also be sent to the computer 502 from internal users (e.g., from a command console or by other appropriate access method), external or third parties, other automated applications, as well as any other appropriate entities, individuals, systems, or computers.

Each of the components of the computer 502 can communicate using a system bus 503. In some implementations, any and/or all the components of the computer 502, both hardware and/or software, may interface with each other and/or the interface 504 over the system bus 503 using an API 512 and/or a service layer 515. The API 512 may include specifications for routines, data structures, and object classes. The API 512 may be either computer language-independent or -dependent and refer to a complete interface, a single function, or even a set of APIs. The service layer 515 provides software services to the computer 502 and/or the EDCS. The functionality of the computer 502 may be accessible for all service consumers using this service layer. Software services, such as those provided by the service layer 515, provide reusable, defined business functionalities through a defined interface. For example, the interface may be software written in JAVA, C++, or other suitable language providing data in extensible markup language (XML) format or other suitable format. While illustrated as an integrated component of the computer 502, alternative implementations may illustrate the API 512 and/or the service layer 515 as stand-alone components in relation to other components of the computer 502 and/or EDCS. Moreover, any or all parts of the API 512 and/or the service layer 515 may be implemented as child or submodules of another software module, enterprise application, or hardware module without departing from the scope of this disclosure.

The computer 502 includes an interface 504. Although illustrated as a single interface 504 in FIG. 5, two or more interfaces 504 may be used according to particular needs, desires, or particular implementations of the computer 502 and/or EDCS. The interface 504 is used by the computer 502 for communicating with other systems in a distributed environment—including within the EDCS—connected to the network 550. Generally, the interface 504 comprises logic encoded in software and/or hardware in a suitable combination and operable to communicate with the network 550. More specifically, the interface 504 may comprise software supporting one or more communication protocols associated with communications such that the network 550 or interface's hardware is operable to communicate physical signals within and outside of the illustrated EDCS.

The computer 502 includes a processor 505. Although illustrated as a single processor 505 in FIG. 5, two or more processors may be used according to particular needs, desires, or particular implementations of the computer 502 and/or the EDCS. Generally, the processor 505 executes instructions and manipulates data to perform the operations of the computer 502. Specifically, the processor 505 executes the functionality required for enabling advanced analytics with large datasets.

The computer 502 can also include a database 506 and memory 508 that hold data for the computer 502 and/or other components of the EDCS. Although illustrated as a single database 506 and memory 508 in FIG. 5, two or more databases 506 and memories 508 may be used according to particular needs, desires, or particular implementations of the computer 502 and/or the EDCS. While database 506 and memory 508 are illustrated as integral components of the computer 502, in alternative implementations, the database 506 and memory 508 can be external to the computer 502 and/or the EDCS. In some implementations, the database can be a conventional database or an in-memory database, or a mix of both. In some implementations, the database 506 and memory 508 can be combined into one component. The database 506 and memory 508 can store large datasets on which the example techniques described with respect to FIGS. 1-3 are performed for enabling advanced analytics. In some implementations, the database is not mandatory, e.g. the data may be located in flat files or in memory, after getting them from an I/O device. Additionally or differently, volatile and/or un-volatile memory can be used.

The application 507 is an algorithmic software engine providing functionality according to particular needs, desires, or particular implementations of the computer 502 and/or the EDCS, particularly with respect to functionalities required for enabling advanced analytics with large datasets. Further, although illustrated as a single application 507, the application 507 may be implemented as multiple applications 507 on the computer 502. In addition, although illustrated as integral to the computer 502, in alternative implementations, the application 507 can be external to the computer 502 and/or the EDCS.

There may be any number of computers 502 associated with, or external to, the EDCS and communicating over network 550. Further, the term "client," "user," and other appropriate terminology may be used interchangeably as appropriate without departing from the scope of this disclosure. Moreover, this disclosure contemplates that many users may use one computer 502, or that one user may use multiple computers 502.

Figure 6:
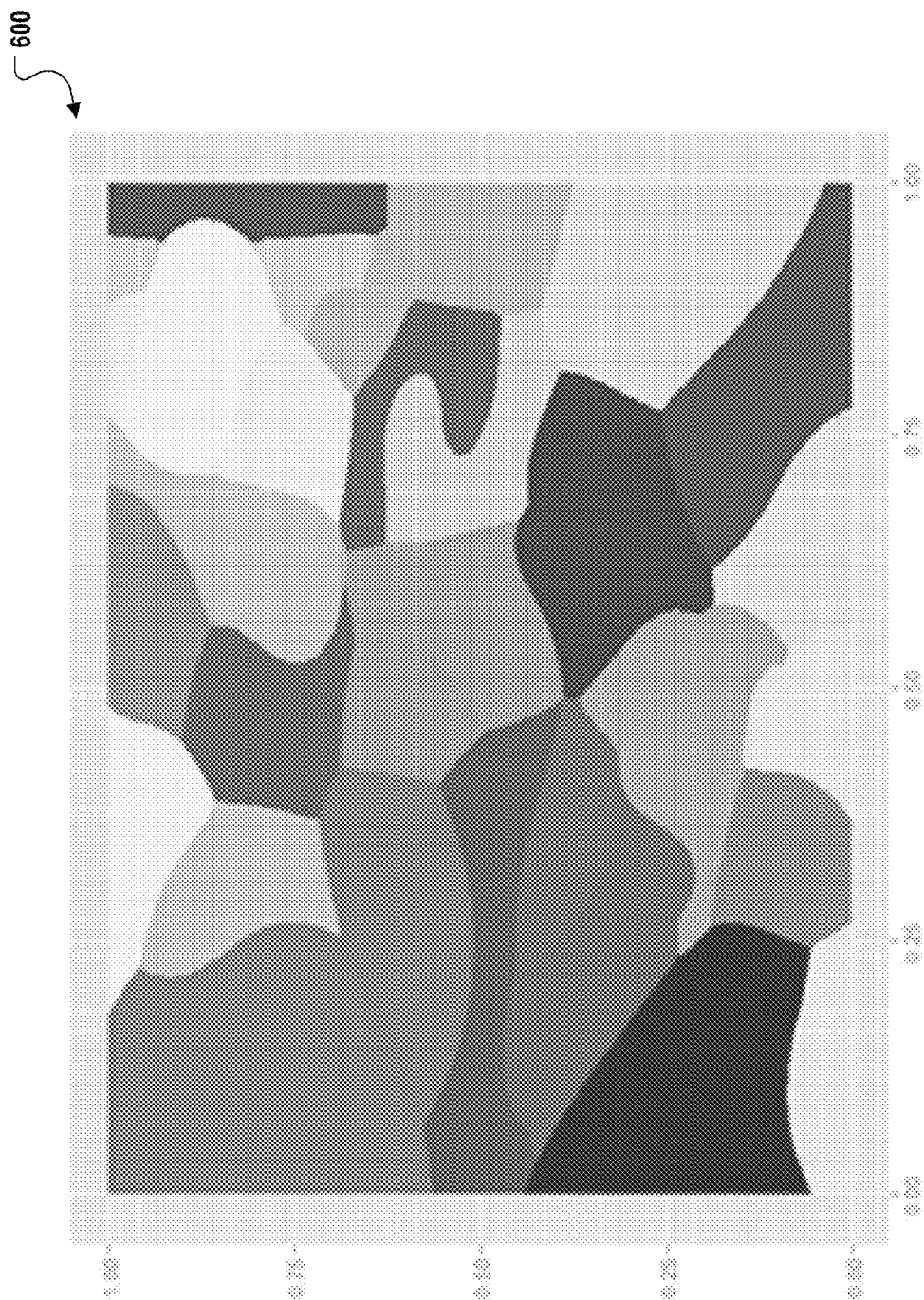
FIG. 6 is a plot illustrating an example of a relatively complex classification task according to an implementation.

FIG. 6 is a plot 600 illustrating an example of a relatively complex classification task according to an implementation. In this example, two features (one along the horizontal and another along the vertical axis) are used for the classification of the target variable. Subsequently, each class is represented using a different color. As shown in FIG. 6, the dataset contains 30 classes and decision boundaries are non-linear and rather complex.

For the classification task of this example, K-Nearest Neighbor (KNN) method is used where each new observation (data record) is classified by finding the closest set of K-neighbors in the training set. Subsequently, the weighted sum of votes between these K-neighbors in the training set is used to decide the class of the observation.

In this example, the smart data selection or segmentation includes selecting the boundary points on the training set and a few insider points to provide gravity to the center of each cluster. In terms of features, a new feature is generated that is the number of data records belonging to other classes within a given neighborhood range of a data record. If the number exceeds a threshold, the data record can be considered as a border point. Then the data records can be segmented as "border" and "non-border" samples. Subsequently, a certain percent of data samples can be intelligently selected from the "border" segments and the rest of them can be chosen from the "non-border" samples. Additional or different selection schemes can be used. For instance, in some implementations, an intermediate segment can be constructed by combining $P_1$ percent of the "border" samples and $P_2$ percent of the "Non-border" samples at random and then the data samples can be selected uniformly at random from the intermediate segment.

Figure 7:
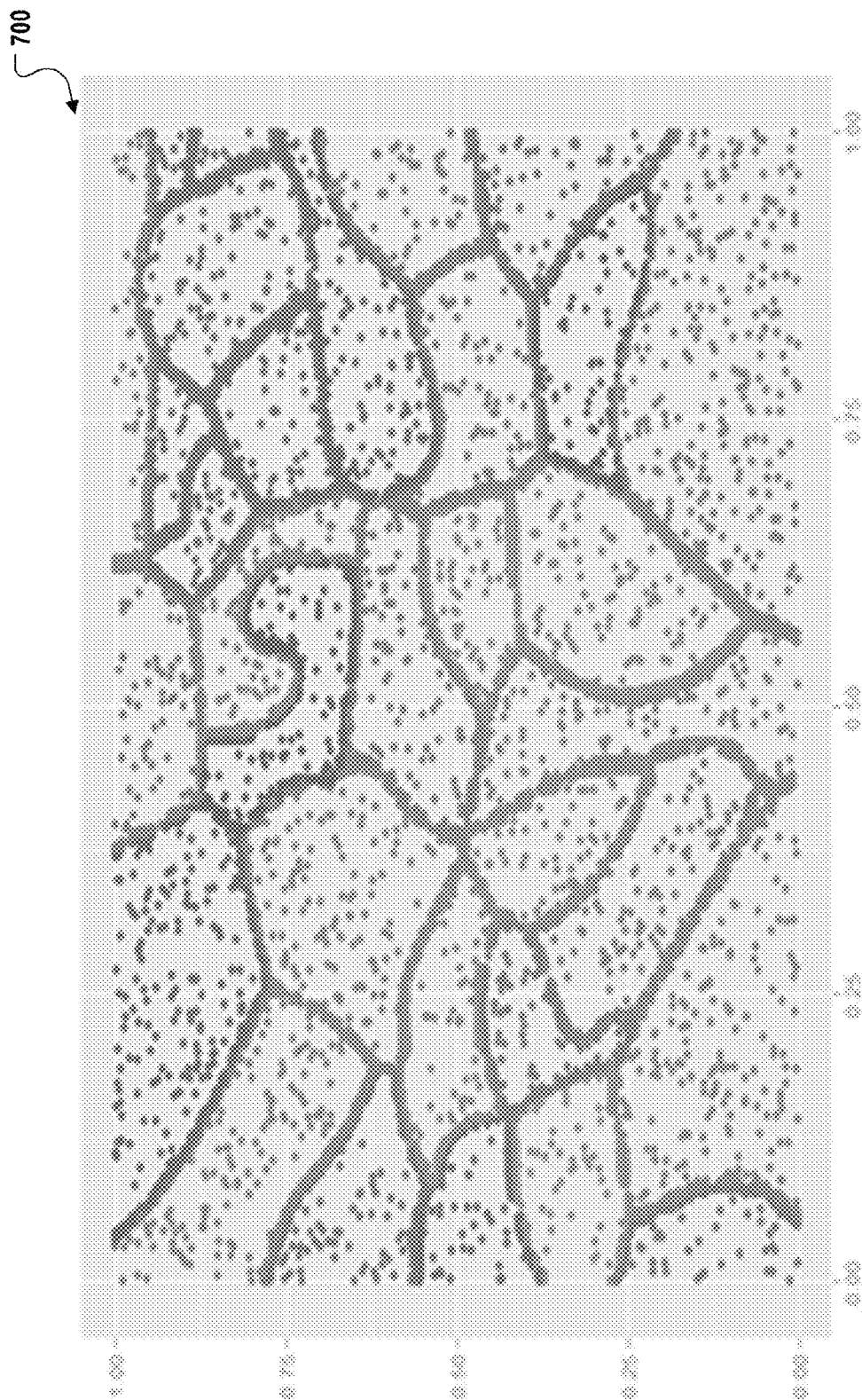
FIG. 7 is a plot illustrating intermediate segment samples selected according to an example smart data selection strategy according to an implementation.

FIG. 7 is a plot 700 illustrating example intermediate segment samples of the dataset shown in FIG. 6 according to the above strategy by setting $P_1=100\%$ and $P_2=10\%$.

Figure 8:
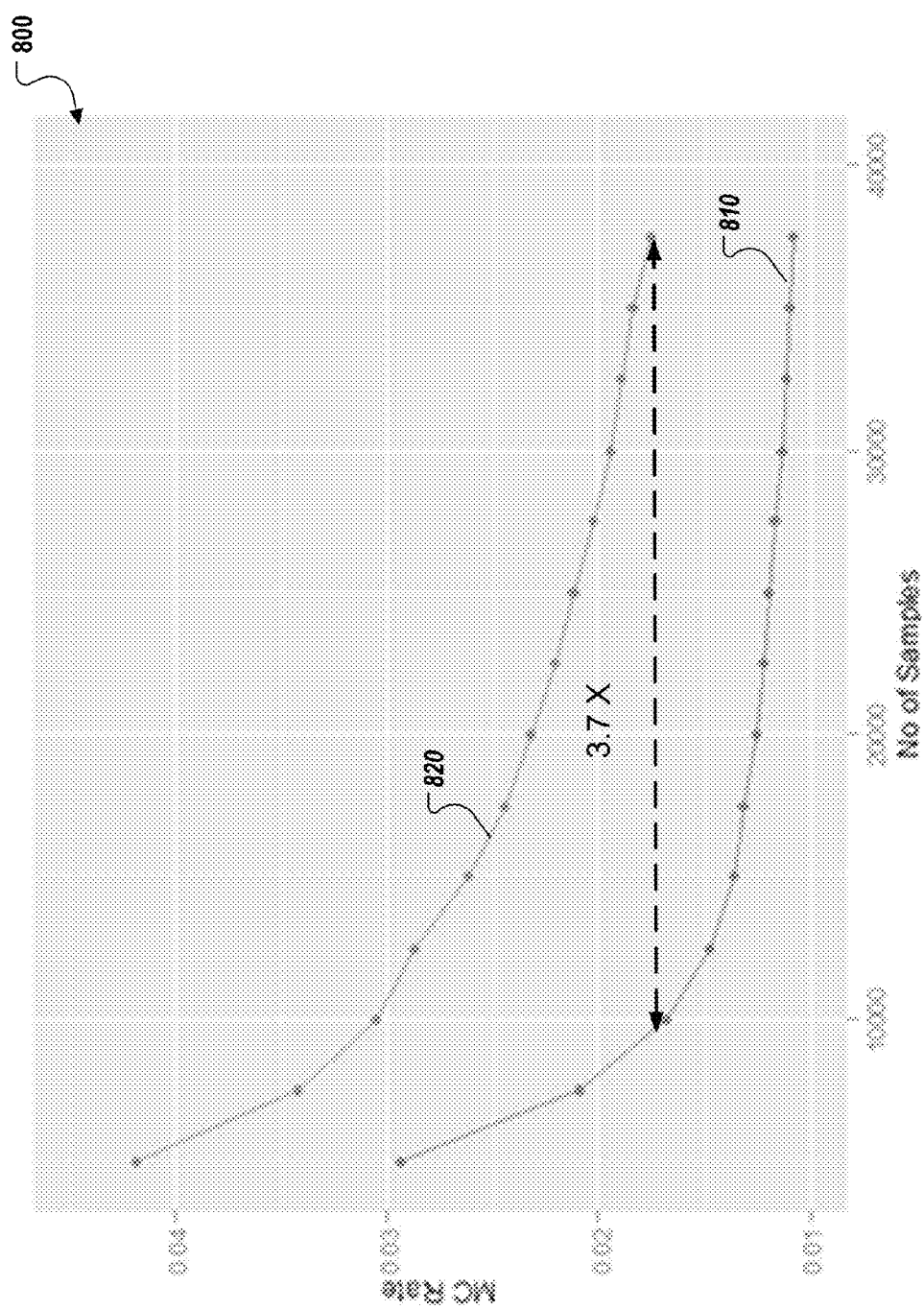
FIG. 8 is a plot showing classification results based on an example smart data selection approach and based on a traditional approach according to an implementation.

FIG. 8 is a plot 800 showing classification results based on the example smart data selection approach using the intermediate stage samples and a traditional approach according to an implementation. Specifically, FIG. 8 shows the misclassification rate as a function of number of samples. The misclassification rate of the example smart data selection scheme is shown as curve 810 and the misclassification rate of the traditional scheme is shown as curve 820. As illustrated, to achieve the same misclassification performance, the example smart data selection scheme requires only 27% (1/3.7) of the data that would be required by the existing traditional approach. Similar results hold true even when the number of classes are increased.

Figure 9:
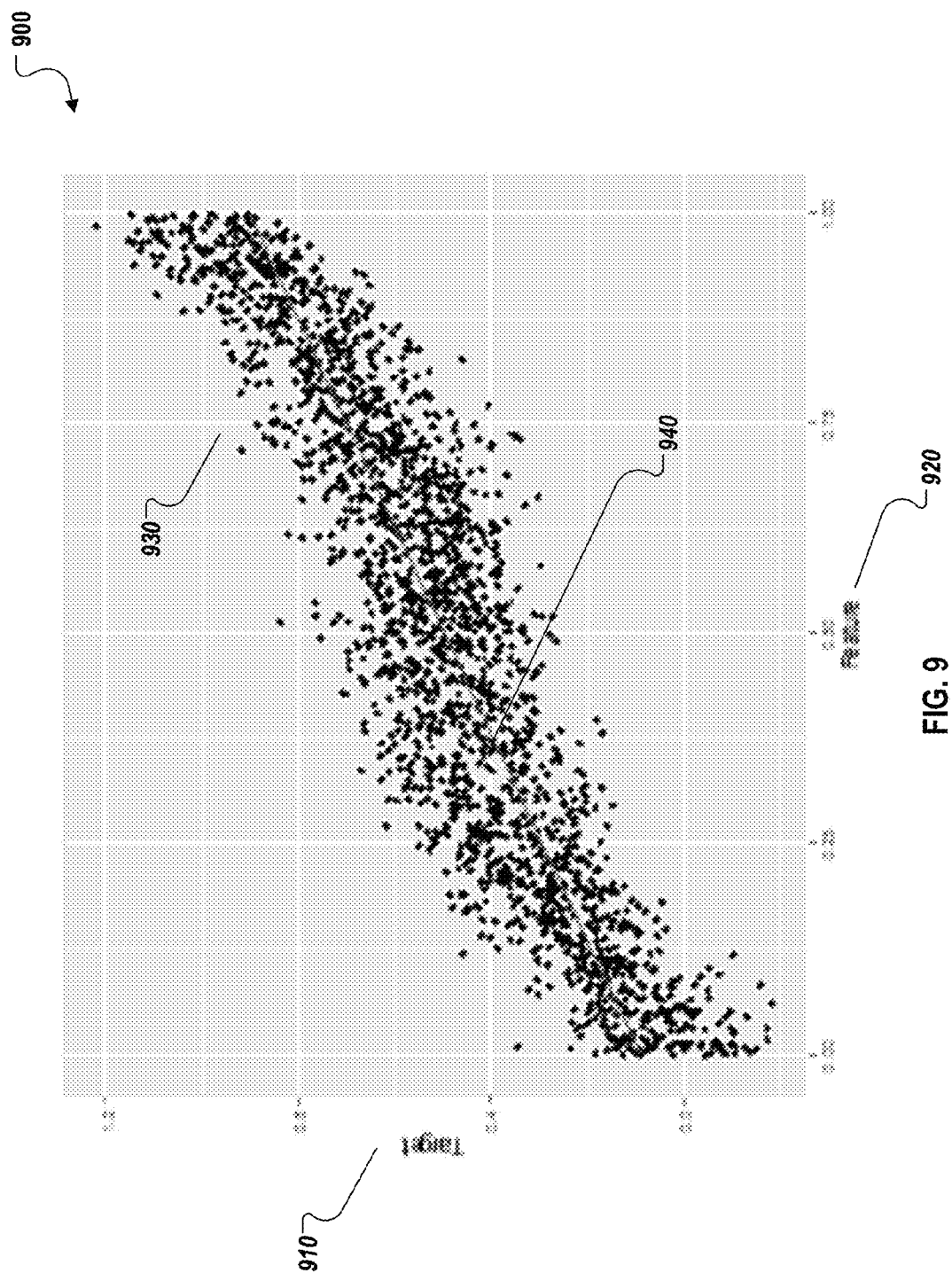
FIG. 9 is a plot showing results of a regression task performed on a dataset by applying example smart data selection techniques according to an implementation.

FIG. 9 is a plot 900 showing results of a regression task performed on a dataset 930 by applying the example smart data selection techniques described above according to an implementation. The dataset contains data records that have a target variable 910 represented by the vertical axis and a feature represented by the horizontal axis 920. The plot 900 shows the target variable 910 can be explained by a single feature variable 920 as a linear line 940 but the residuals are non-uniformly distributed along different values of the feature variable 920.

Figure 10:
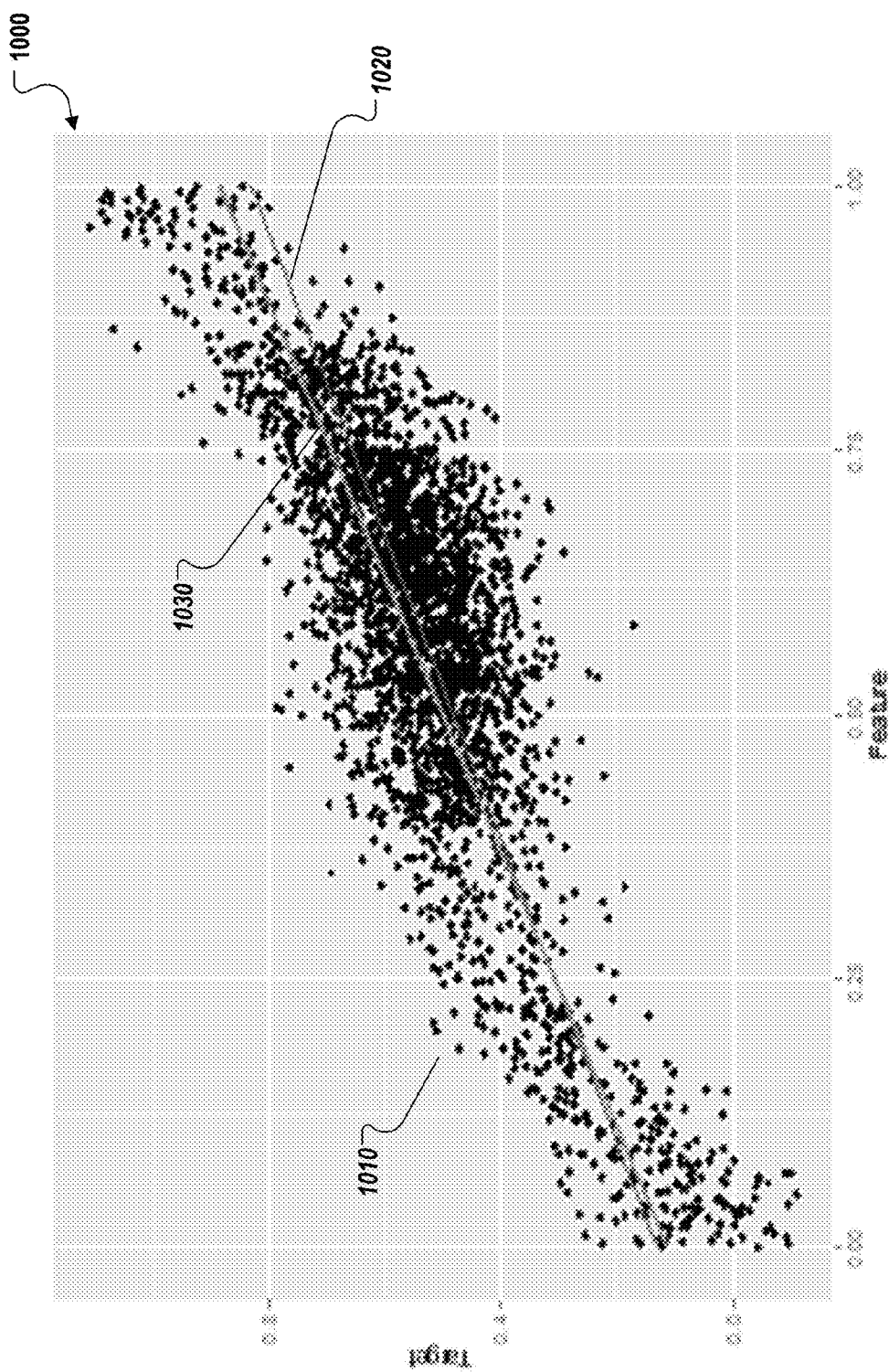
FIG. 10 is a plot showing results of another regression task performed on another dataset by applying example smart data selection techniques according to an implementation.

FIG. 10 is a plot 1000 showing results of another regression task performed on another dataset 1010 by applying the example 3-step smart data selection techniques described above according to an implementation. The plot 1000 shows the initial training set 1010 contains notably more samples in a specific range of training set. In this case the training set 1010 can be segmented in its simplest form by considering different fixed intervals of the feature space. Given the prior knowledge of feature values being uniformly distributed, with the example smart segmentation strategy, data samples can be selected equally from all intervals. The fitted line 1020 according to the smart segmentation strategy is shown to be a better fit compared to the fitted line 1030 obtained based on the original training data 1010. Indeed, the example 3-step smart data selection techniques require only 10% of the data and achieve an 18% performance improvement (in terms of sum of the squared errors) compared to the traditional approach by using the original dataset.

Accordingly, the experiments show the example smart sampling techniques make it possible for all existing analytical platforms to benefit from availability of large training data sets, despite their existing limitations in terms of memory and processing power. The example smart sampling techniques can have significant business impact as they enable the very sought after functionalities in an era of the Big Data.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms "data processing apparatus," "computer," and/or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, e.g., a central processing unit (CPU), a graphical processing unit (GPU), an FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a GPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto-optical disks; and CD-ROM, DVD+/–R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language-independent or -dependent and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method comprising:
   receiving, by operation of a computer system, a dataset of a plurality of data records, each of the plurality of data records comprising a plurality of features and one or more target variables;
   selecting key features among the plurality of features based at least on relevance measures of the plurality of features with respect to the one or more target variables, wherein selecting key features among the plurality of features comprises:
      selecting a first subset of data records with a first size from the dataset of the plurality of data records;
      selecting a first subset of features from the plurality of features of the first subset of data records;
      selecting a second subset of features from the plurality of features of the first subset of data records;
      computing a similarity metric between the first subset of features and the second subset of features;
      determining that the first subset of features and the second subset of features converge based on the similarity metric; and
      in response to the determination, identifying key features of the dataset based on the first subset of features and the second subset of features of the first subset of data records;
      calculating a first set of relevance measures of each of the first subset of features with respect to the target variable;
      calculating a second set of relevance measures of each of the second subset of features with respect to the target variable; and
      wherein computing a similarity metric comprises computing the similarity metric based on the first set of relevance measures and the second set of relevance measures;
   dividing the dataset into a plurality of subsets;
   for each of the plurality of subsets, identifying a plurality of clusters and respective centroids of the plurality of clusters based on the key features;
   identifying a plurality of final centroids based on the respective centroids of the plurality of clusters for the each of the plurality of subsets, the plurality of final centroids being respective centroids of a plurality of final clusters; and
   for each data record in the plurality of subsets, assigning the data record to one of the plurality of final clusters based on distances between the data record and the plurality of final centroids.

2. The method of claim 1, further comprising:
   assigning a respective processor to each of the plurality of subsets;
   wherein, for each of the plurality of subsets, identifying a plurality of clusters and respective centroids of the clusters comprises identifying, by the respective processor of the each of the plurality of subsets, the plurality of clusters and respective centroids of the clusters; and
   wherein, for each data record in the plurality of subsets, assigning the data record to one of the plurality of final clusters comprises, for each data record in the plurality of subsets, assigning, by the respective processor of the each of the plurality of subsets, the data record to one of the plurality of final clusters.

3. The method of claim 1, further comprising:
   selecting a respective number of data records from each of the plurality of final clusters to represent the dataset of the plurality of data records; and
   performing a data mining algorithm based on the respective number of data records from each of the plurality of final clusters.

4. The method of claim 3, wherein the respective number of data records from each of the plurality of final clusters exceeds a respective threshold or is proportional to a respective size of each of the plurality of final clusters.

5. The method of claim 1, further comprising:
   determining that the first subset of features and the second subset of features do not converge based on the similarity metric;
   in response to the determination, selecting a second subset of data records with a second size from the dataset of the plurality of data records, the second size of the second subset of data records being larger than the first size of the first subset of data records;

selecting a third subset of features from the plurality of features of the second subset of data records;

selecting a fourth subset of features from the plurality of features of the second subset of data records;

computing a second similarity metric between the third subset of features and the fourth subset of features;

determining that the third subset of features and the fourth subset of features converge based on the second similarity metric; and in response to the determining, identifying key features of the dataset based on the third subset of features and the fourth subset of features of the subset of data records.

6. A non-transitory, computer-readable medium storing computer-readable instructions executable by a computer and configured to perform operations comprising:

receiving, by operation of a computer system, a dataset of a plurality of data records, each of the plurality of data records comprising a plurality of features and one or more target variables;

selecting key features among the plurality of features based at least on relevance measures of the plurality of features with respect to the one or more target variables, wherein selecting key features among the plurality of features comprises:

selecting a first subset of data records with a first size from the dataset of the plurality of data records;

selecting a first subset of features from the plurality of features of the first subset of data records;

selecting a second subset of features from the plurality of features of the first subset of data records;

computing a similarity metric between the first subset of features and the second subset of features;

determining that the first subset of features and the second subset of features converge based on the similarity metric; and in response to the determination, identifying key features of the dataset based on the first subset of features and the second subset of features of the first subset of data records;

calculating a first set of relevance measures of each of the first subset of features with respect to the target variable;

calculating a second set of relevance measures of each of the second subset of features with respect to the target variable; and wherein computing a similarity metric comprises computing the similarity metric based on the first set of relevance measures and the second set of relevance measures;

dividing the dataset into a plurality of subsets;

for each of the plurality of subsets, identifying a plurality of clusters and respective centroids of the plurality of clusters based on the key features;

identifying a plurality of final centroids based on the respective centroids of the plurality of clusters for the each of the plurality of subsets, the plurality of final centroids being respective centroids of a plurality of final clusters; and for each data record in the plurality of subsets, assigning the data record to one of the plurality of final clusters based on distances between the data record and the plurality of final centroid.

7. The medium of claim 6, the operations further comprising:

assigning a respective processor to each of the plurality of subsets;

wherein, for each of the plurality of subsets, identifying a plurality of clusters and respective centroids of the clusters comprises identifying, by the respective processor of the each of the plurality of subsets, the plurality of clusters and respective centroids of the clusters; and wherein, for each data record in the plurality of subsets, assigning the data record to one of the plurality of final clusters comprises, for each data record in the plurality of subsets, assigning, by the respective processor of the each of the plurality of subsets, the data record to one of the plurality of final clusters.

8. The medium of claim 6, the operations further comprising:

selecting a respective number of data records from each of the plurality of final clusters to represent the dataset of the plurality of data records; and performing a data mining algorithm based on the respective number of data records from each of the plurality of final clusters.

9. The medium of claim 8, wherein the respective number of data records from each of the plurality of final clusters exceeds a respective threshold or is proportional to a respective size of each of the plurality of final clusters.

10. The medium of claim 6, the operations further comprising:

determining that the first subset of features and the second subset of features do not converge based on the similarity metric;

in response to the determination, selecting a second subset of data records with a second size from the dataset of the plurality of data records, the second size of the second subset of data records being larger than the first size of the first subset of data records;

selecting a third subset of features from the plurality of features of the second subset of data records;

selecting a fourth subset of features from the plurality of features of the second subset of data records;

computing a second similarity metric between the third subset of features and the fourth subset of features;

determining that the third subset of features and the fourth subset of features converge based on the second similarity metric; and in response to the determining, identifying key features of the dataset based on the third subset of features and the fourth subset of features of the subset of data records.

11. A system, comprising:

a memory;

at least one hardware processor interoperably coupled with the memory and configured to perform operations comprising:

receiving, by operation of a computer system, a dataset of a plurality of data records, each of the plurality of data records comprising a plurality of features and one or more target variables;

selecting key features among the plurality of features based at least on relevance measures of the plurality of features with respect to the one or more target variables, wherein selecting key features among the plurality of features comprises:

selecting a first subset of data records with a first size from the dataset of the plurality of data records;

selecting a first subset of features from the plurality of features of the first subset of data records;

selecting a second subset of features from the plurality of features of the first subset of data records;

computing a similarity metric between the first subset of features and the second subset of features;

determining that the first subset of features and the second subset of features converge based on the similarity metric; and in response to the determination, identifying key features of the dataset based on the first subset of features and the second subset of features of the first subset of data records;

calculating a first set of relevance measures of each of the first subset of features with respect to the target variable;

calculating a second set of relevance measures of each of the second subset of features with respect to the target variable; and wherein computing a similarity metric comprises computing the similarity metric based on the first set of relevance measures and the second set of relevance measures;

dividing the dataset into a plurality of subsets;

for each of the plurality of subsets, identifying a plurality of clusters and respective centroids of the plurality of clusters based on the key features;

identifying a plurality of final centroids based on the respective centroids of the plurality of clusters for the each of the plurality of subsets, the plurality of final centroids being respective centroids of a plurality of final clusters; and for each data record in the plurality of subsets, assigning the data record to one of the plurality of final clusters based on distances between the data record and the plurality of final centroids.

12. The system of claim 11, wherein the operations further comprise:

assigning a respective processor to each of the plurality of subsets;

wherein, for each of the plurality of subsets, identifying a plurality of clusters and respective centroids of the clusters comprises identifying, by the respective processor of the each of the plurality of subsets, the plurality of clusters and respective centroids of the clusters; and wherein, for each data record in the plurality of subsets, assigning the data record to one of the plurality of final clusters comprises, for each data record in the plurality of subsets, assigning, by the respective processor of the each of the plurality of subsets, the data record to one of the plurality of final clusters.

13. The system of claim 11, wherein the operations further comprise:

selecting a respective number of data records from each of the plurality of final clusters to represent the dataset of the plurality of data records; and performing a data mining algorithm based on the respective number of data records from each of the plurality of final clusters.

14. The system of claim 13, wherein the respective number of data records from each of the plurality of final clusters exceeds a respective threshold or is proportional to a respective size of each of the plurality of final clusters.

15. The system of claim 11, wherein the operations further comprise:

determining that the first subset of features and the second subset of features do not converge based on the similarity metric;

in response to the determination, selecting a second subset of data records with a second size from the dataset of the plurality of data records, the second size of the second subset of data records being larger than the first size of the first subset of data records;

selecting a third subset of features from the plurality of features of the second subset of data records;

selecting a fourth subset of features from the plurality of features of the second subset of data records;

computing a second similarity metric between the third subset of features and the fourth subset of features;

determining that the third subset of features and the fourth subset of features converge based on the second similarity metric; and in response to the determining, identifying key features of the dataset based on the third subset of features and the fourth subset of features of the subset of data records.

* * * * *